United States Patent
Mody et al.

(10) Patent No.: US 10,326,487 B2
(45) Date of Patent: Jun. 18, 2019

(54) PORTABLE ELECTRONICS CASE WITH SUPPORT STAND

(71) Applicant: CASE-MATE, INC., Atlanta, GA (US)

(72) Inventors: Saumil Chetan Mody, Smyrna, GA (US); Nitin Koshy Philip, Brookhaven, GA (US); William Van Gelderen, Atlanta, GA (US)

(73) Assignee: CASE-MATE, INC., Atlanta, GA (US)

( * ) Notice: Subject to any disclaimer, the term of this patent is extended or adjusted under 35 U.S.C. 154(b) by 0 days.

(21) Appl. No.: 15/671,700

(22) Filed: Aug. 8, 2017

(65) Prior Publication Data

US 2018/0041237 A1 Feb. 8, 2018

Related U.S. Application Data

(60) Provisional application No. 62/372,000, filed on Aug. 8, 2016.

(51) Int. Cl.
| | |
|---|---|
| H04B 1/38 | (2015.01) |
| H04B 1/3877 | (2015.01) |
| H04B 1/3888 | (2015.01) |
| H04M 1/04 | (2006.01) |
| A45F 5/00 | (2006.01) |
| A45C 11/00 | (2006.01) |

(52) U.S. Cl.
CPC ......... *H04B 1/3877* (2013.01); *H04B 1/3888* (2013.01); *H04M 1/04* (2013.01); *A45C 2011/002* (2013.01); *A45C 2200/15* (2013.01); *A45F 5/00* (2013.01); *A45F 2200/0516* (2013.01)

(58) Field of Classification Search
CPC combination set(s) only.
See application file for complete search history.

(56) References Cited

U.S. PATENT DOCUMENTS

| | | | |
|---|---|---|---|
| 8,201,687 | B2 | 6/2012 | Zeliff et al. |
| 8,457,702 | B2 | 6/2013 | Lee |
| 8,897,033 | B2 | 11/2014 | Slipy et al. |
| 8,964,382 | B2 | 2/2015 | Ashcraft et al. |
| 9,185,954 | B2 | 11/2015 | Cheung et al. |
| 9,267,638 | B2 | 2/2016 | Le Gette et al. |
| 9,379,759 | B2 | 6/2016 | Platt |
| 9,677,702 | B2 | 6/2017 | Kim |
| 2009/0017883 | A1 | 6/2009 | Lin |
| 2012/0025039 | A1 | 2/2012 | Segal |
| 2012/0168577 | A1 | 7/2012 | Cheng |
| 2013/0002049 | A1 | 1/2013 | Stampfli |
| 2013/0079066 | A1 | 3/2013 | Chan |
| 2013/0286623 | A1* | 10/2013 | Slipy .............. H04M 1/0202 361/807 |
| 2014/0051488 | A1 | 2/2014 | Chung |

(Continued)

*Primary Examiner* — Junpeng Chen
(74) *Attorney, Agent, or Firm* — Gardner Groff Greenwald & Villanueva, PC

(57) ABSTRACT

A case for an electronic device, the case including a back panel, one or more sidewalls, and a support stand selectively extendable from the back panel for supporting the electronic devices in vertical and/or horizontal orientations. The support stand can be selectively extendable between a storage position and a plurality of use positions. The support stand can include positioning mechanism comprising a translating engagement feature and a rotating engagement feature.

20 Claims, 20 Drawing Sheets

(56) References Cited

U.S. PATENT DOCUMENTS

| | | | |
|---|---|---|---|
| 2014/0141838 A1 | 5/2014 | Cai et al. | |
| 2014/0299488 A1* | 10/2014 | Andrew | A45C 13/002 |
| | | | 206/37 |
| 2014/0357328 A1 | 12/2014 | Aharon et al. | |
| 2014/0364176 A1 | 12/2014 | Pintor | |
| 2015/0117683 A1* | 4/2015 | Ozasa | B06B 1/0603 |
| | | | 381/190 |
| 2015/0156297 A1* | 6/2015 | Crawford | H04M 1/0262 |
| | | | 455/26.1 |
| 2015/0156301 A1 | 6/2015 | Crawford et al. | |
| 2016/0028430 A1 | 1/2016 | Crawford et al. | |
| 2016/0036479 A1 | 2/2016 | Lin | |
| 2016/0066453 A1* | 3/2016 | Quehl | A45C 11/00 |
| | | | 206/45.2 |
| 2017/0150792 A1* | 6/2017 | Kim | B08B 3/022 |

* cited by examiner

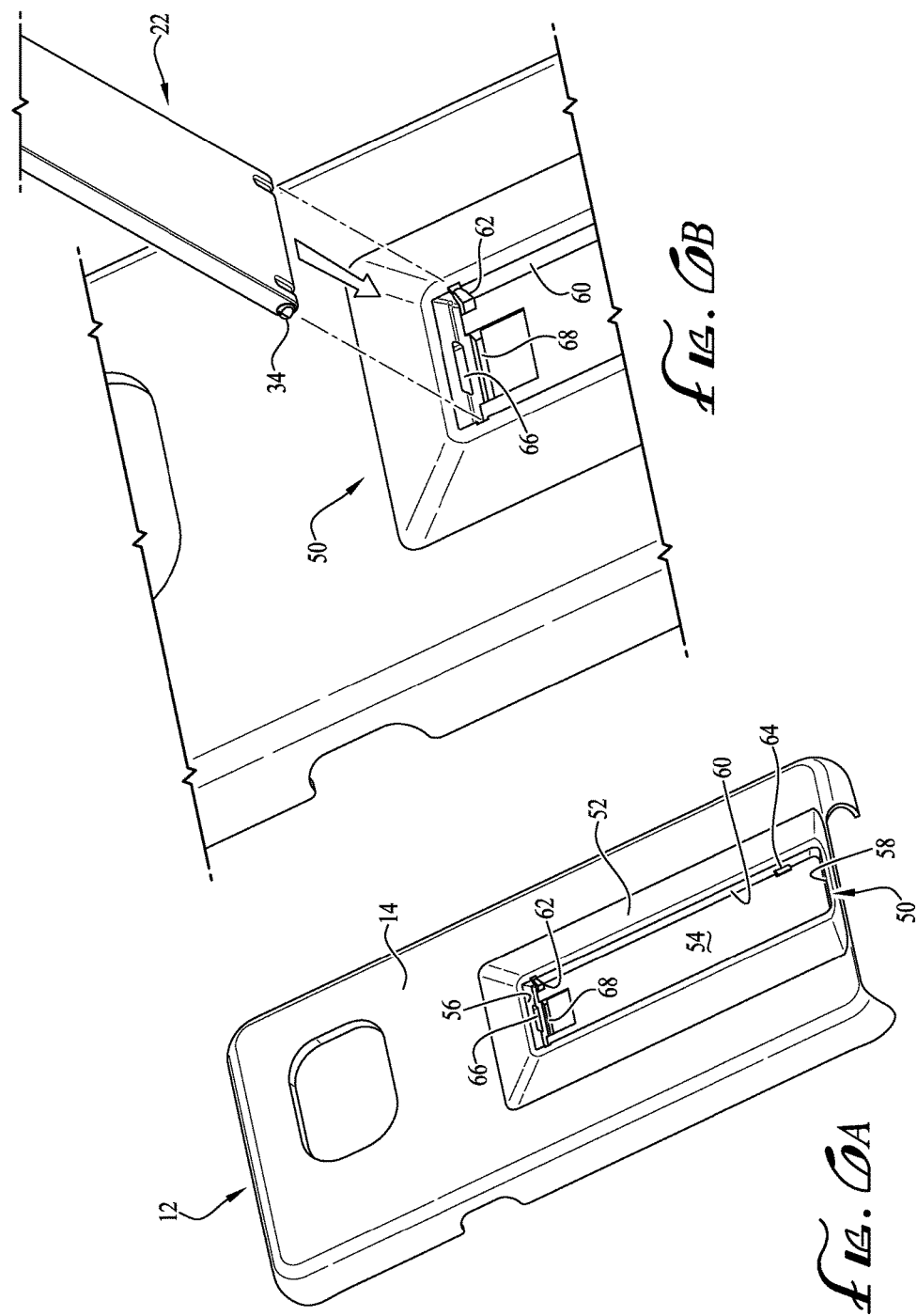

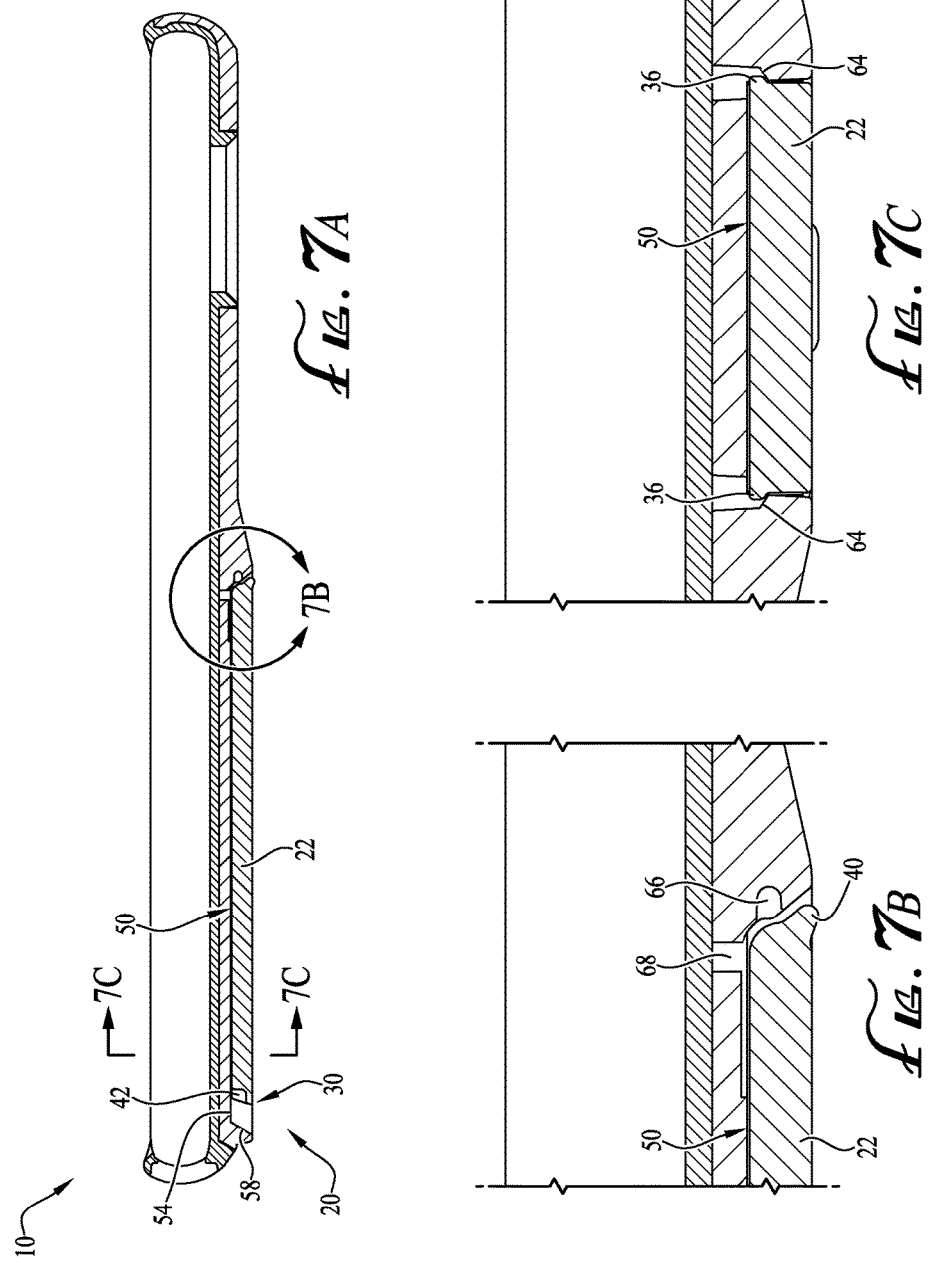

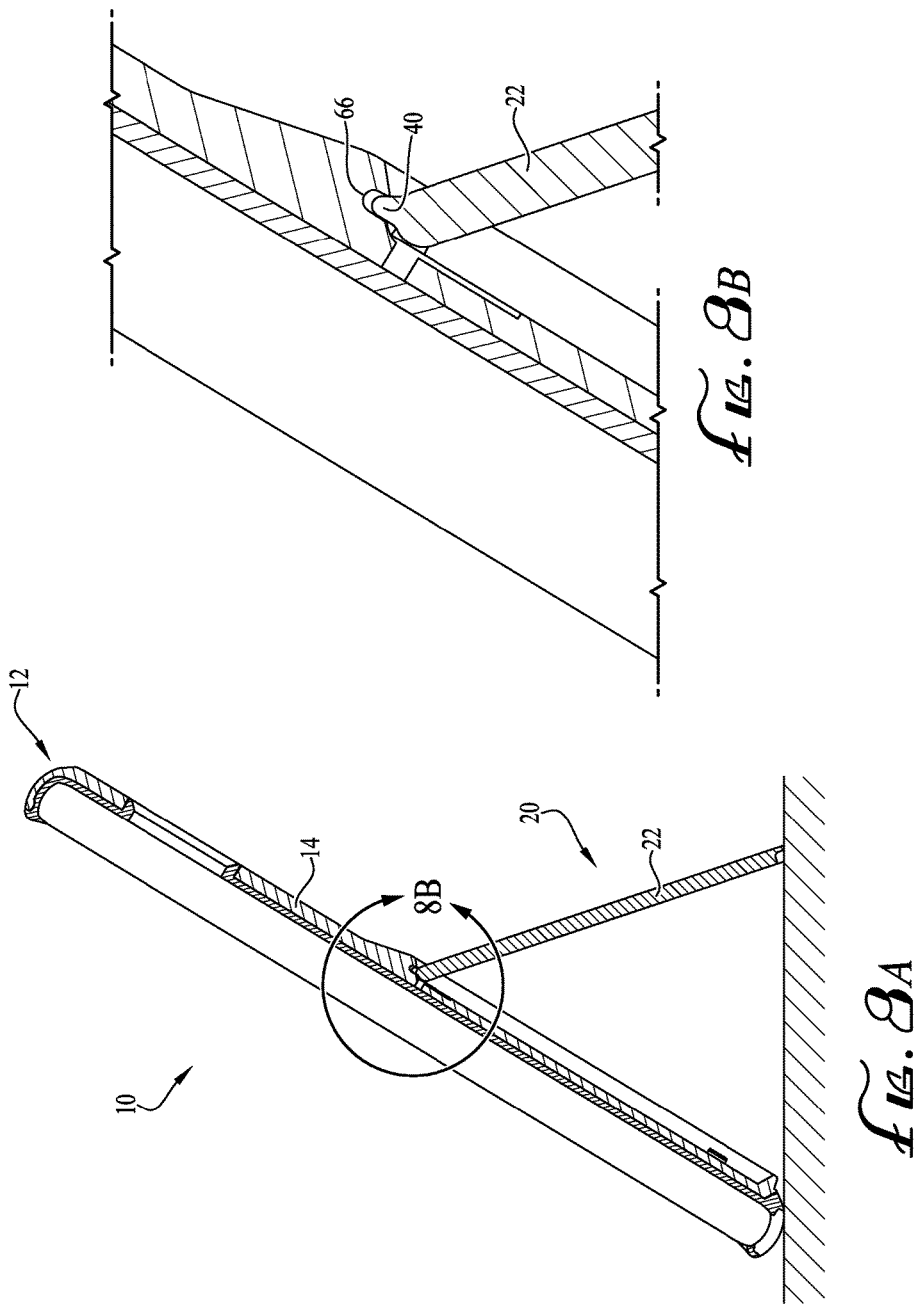

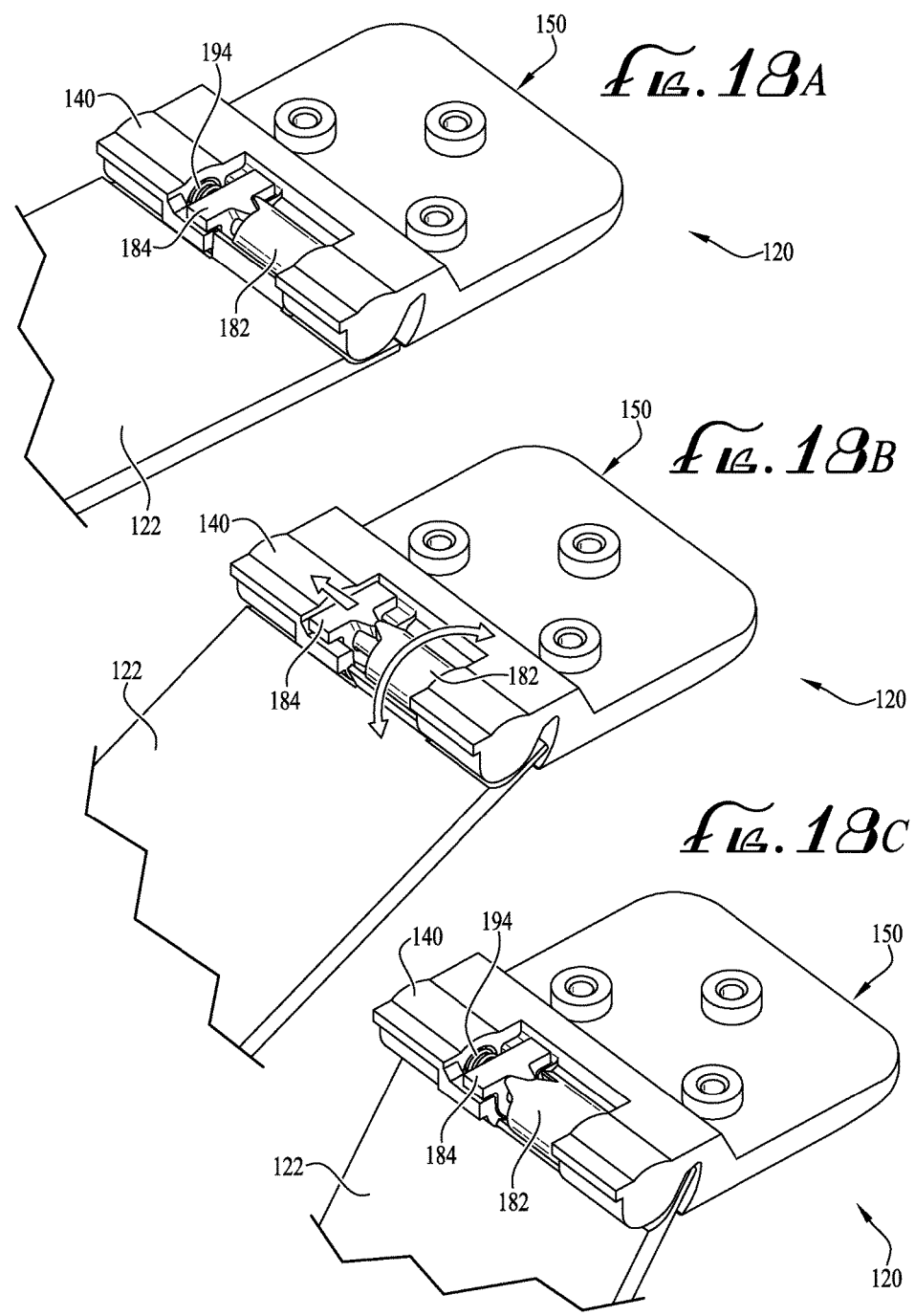

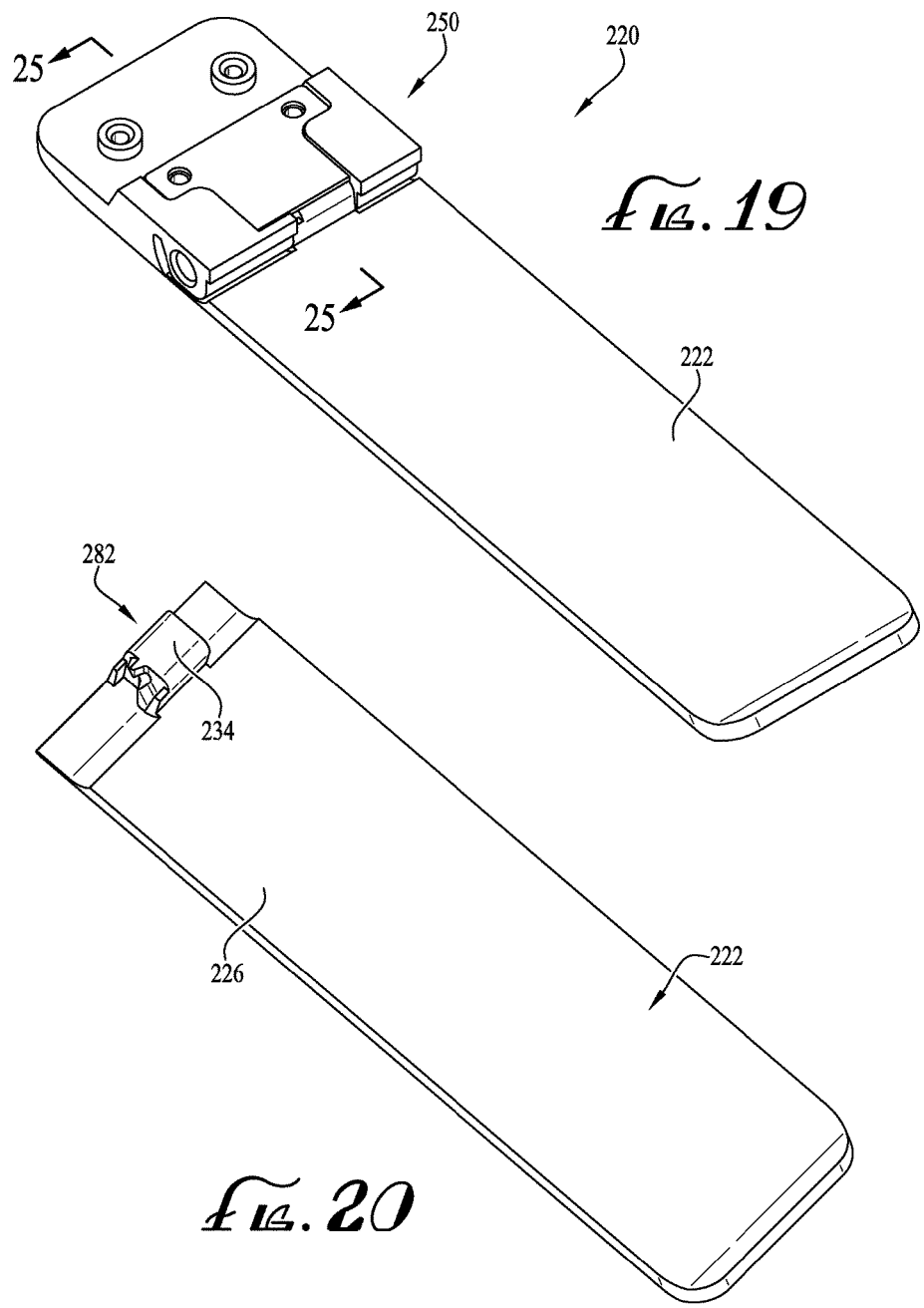

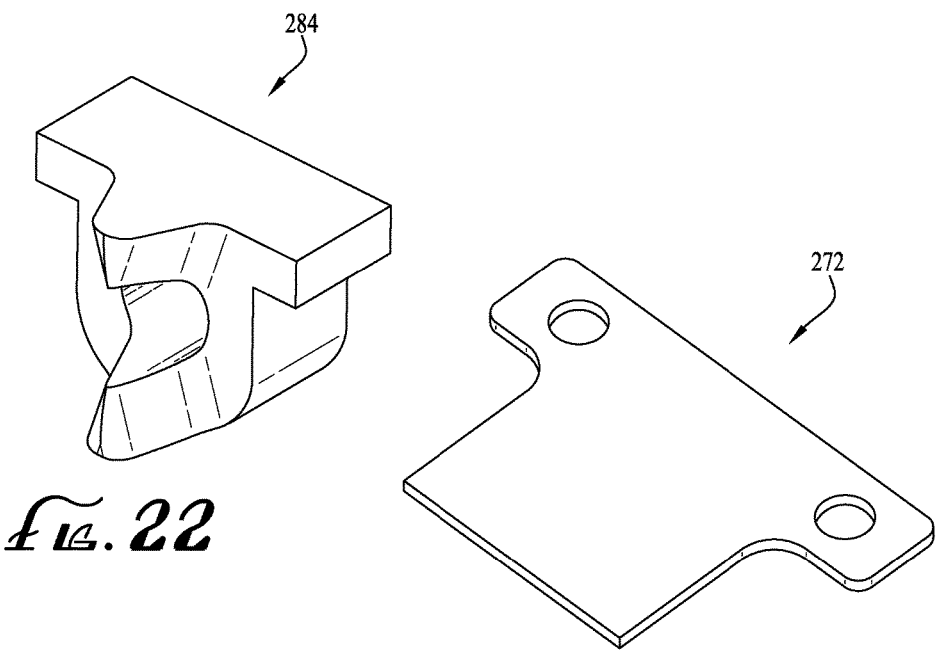
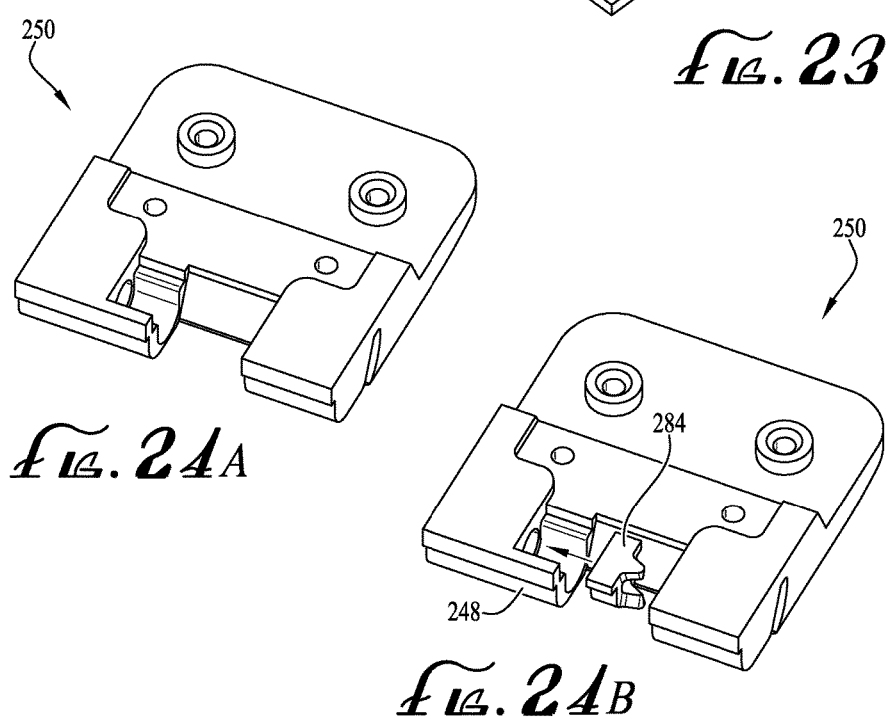

PORTABLE ELECTRONICS CASE WITH SUPPORT STAND

CROSS-REFERENCE TO RELATED APPLICATION

This application claims the benefit of U.S. Provisional Patent Application Ser. No. 62/372,000 filed Aug. 8, 2016, the entirety of which is hereby incorporated herein by reference for all purposes.

TECHNICAL FIELD

The present invention relates generally to the field of protective and/or ornamental cases or housings for mobile phones and other portable electronic devices, and more particularly to cases having support stands for supporting an electronic device in vertical and/or horizontal orientations.

SUMMARY

In example embodiments, the present invention provides a support stand for a case or housing for a smart phone, tablet, or other electronic device.

In one aspect, the present invention relates to a case for an electronic device, the case including a back panel, one or more sidewalls, and a support stand selectively extendable from the back panel for supporting the electronic devices in vertical and/or horizontal orientations.

In another aspect, the present invention relates to a case for an electronic device comprising a back panel, one or more sidewalls, and a support stand selectively extendable from the back panel. The support stand is configured to be releasably held in at least two use positions. Each use position defines an angle between the support stand and the back panel. The support stand is configured to support the electronic device in both a horizontal position or a vertical position.

In still another aspect, the present invention relates to a support stand for an electronic device comprising a base, an arm pivotally attached to the base which is and a positioning mechanism comprising at least one rotating feature and at least one translating feature. The arm is configured to be releasably held in a storage position and repositionable from the storage position to at least one use position. The support stand is configured to support electronic device case both in a horizontal position and a vertical position.

In still another aspect, the present invention relates to a support stand for an electronic device case comprising an arm pivotally attached to a base which is attached to an electronic device case. The support stand also includes a rotating cam having at least two flat surfaces. The rotating cam is attached to the arm in a fixed position. The support stand also includes a leaf spring configured to engage the at least two flat surfaces of the rotating cam. The support stand is configured to support electronic device case in both a horizontal position and a vertical position.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 6A is a perspective view of the back of the portable electronics case of FIG. 1.

FIG. 6B is a detailed exploded view of the portable electronics case with support stand of FIG. 1.

FIG. 7A is a cut-away side view of the portable electronics case with support stand of FIG. 4.

FIG. 7B is a detailed cut-away view of the portable electronics case with support stand of FIG. 7A.

FIG. 7C is a detailed cut-away view of the portable electronics case with support stand of FIG. 7A.

FIG. 8A is a cut-away side view of the portable electronics case with support stand of FIG. 1.

FIG. 8B is a detailed view of the portable electronics case with support stand of FIG. 8A.

FIG. 18A is a detailed perspective view of the support stand of FIG. 11 is a stored position.

FIG. 18B is a detailed perspective view of the support stand of FIG. 11 in an intermediate position.

FIG. 18C is a detailed perspective view of the support stand of FIG. 11 in a use position.

FIG. 19 is a perspective view of a support stand for a portable electronics case according to another example embodiment of the invention.

FIG. 20 is a perspective view of the back of the arm of the support stand of FIG. 19.

FIG. 22 is a perspective view of the cam of the support stand of FIG. 19.

FIG. 23 is a perspective view of the leaf spring of the support stand of FIG. 19.

FIGS. 24A-E are exploded views showing the assembly of the support stand of FIG. 19.

DETAILED DESCRIPTION OF EXAMPLE EMBODIMENTS

Figure 1:
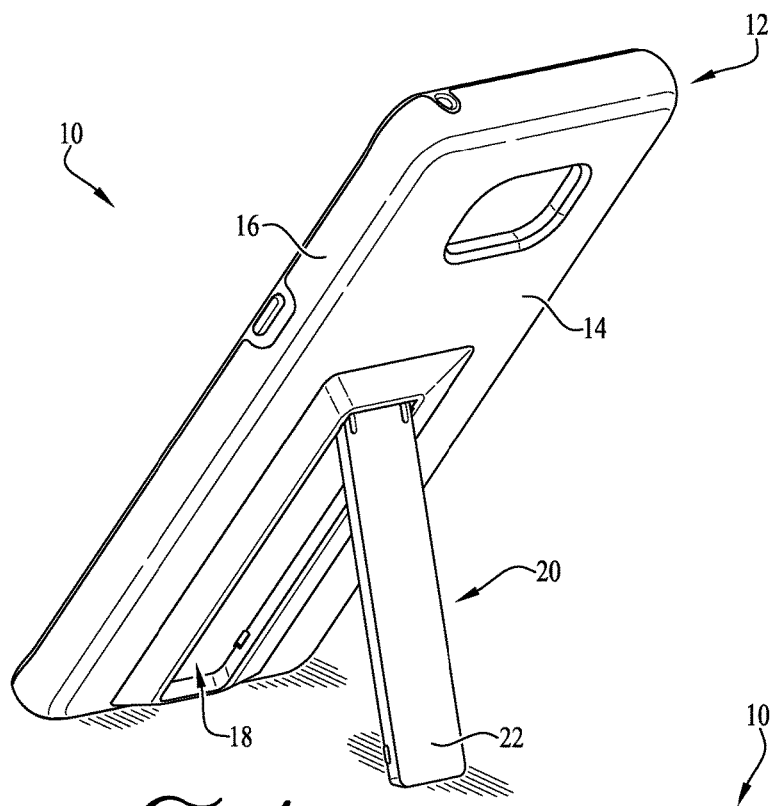
FIG. 1 is a perspective view of a portable electronics case with support stand according to an example embodiment of the invention, where the support stand is in a first use position and the portable electronics case is in portrait orientation.

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-10 show a support stand 20 for an electronic device case 12, and a case having such a support stand 10, according to an example embodiment of the present invention. The support stand 20 is selectively extendable from the electronic device case 12 to at least two use positions for supporting the portable electronic device in vertical and/or horizontal orientations. Each use position holds the support stand 20 at a different angle relative to the electronic device case 12.

The electronic device case 12 generally comprises a back or base panel 14 and at least one peripheral sidewall or frame 16. In the depicted embodiment, the base or back panel component 12 comprises a generally rectangular planar back with rounded corners, configured to generally match the external geometry of a specified model of smart phone. In alternate embodiments, the shape and size of the case are configured to generally match the external geometry of other electronics devices, such as for example, tablet computers, smart phones, cell phones, MP3 players and other portable music and/or video players, electronic readers, handheld game devices, and the like. The back wall 14 optionally includes one or more openings or cutouts for alignment with a camera, flash unit, controls, and/or other features of the electronic device to which the case 10 is configured for use. In example forms, the electronic device case 12 is formed of polycarbonate or other hard plastic, metal, composite, polymeric, ceramic and/or other material(s) of construction. The support stand 20 is generally attached to the back panel 14 of the electronic device case 12.

Figure 2:
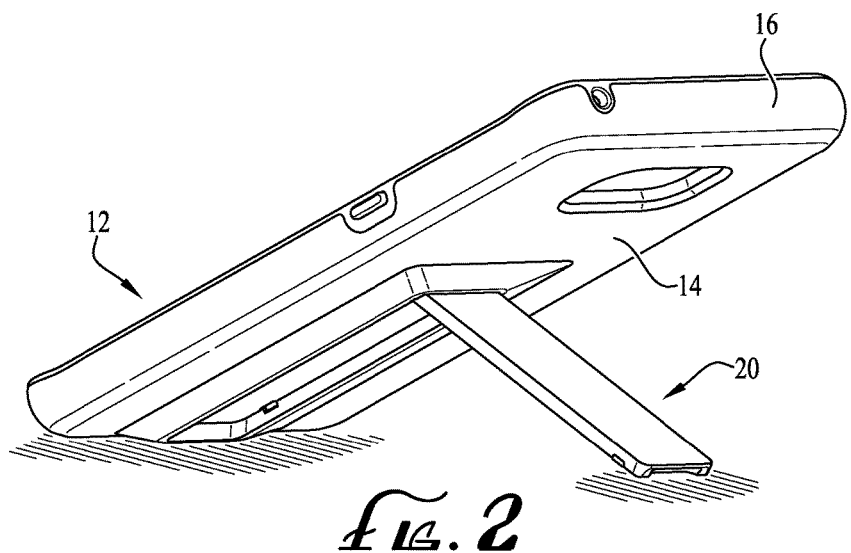
FIG. 2 is a perspective view of the portable electronics case with support stand of FIG. 1, where the support stand is in a second use position and the portable electronics case is in a portrait orientation.
Figure 3:
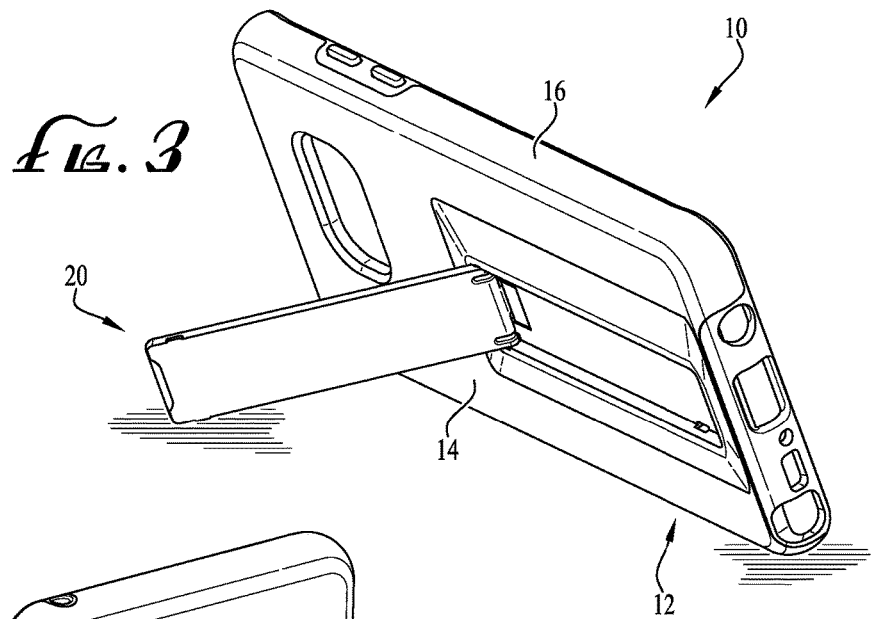
FIG. 3 is a perspective view of the portable electronics case with support stand of FIG. 1, where the support stand is in a second use position and the portable electronics case is in a landscape orientation.

As shown in FIGS. 1-4, the support stand 20 is configured to support the electronic device case 12 at an angle against a support surface. In the example embodiment, the support stand 20 is movable or extendable between a first use position, shown in FIG. 1, a second use position, shown in FIGS. 2 and 3, and a storage position, shown in FIG. 4. The support stand 20 can support the electronic device case 12 in both a vertical or portrait orientation, shown in FIGS. 1 and 2, and a horizontal or landscape orientation, shown in FIG. 3. In the first deployed or use position the support stand 20 is held at an acute angle relative to the back panel 14 of the electronic device case 12. In the second deployed or use position, as shown in FIGS. 2 and 3, the support stand 20 is held at an obtuse angle relative to the back panel 14 of the electronic device case 12. In other embodiments, the support stand 20 can be configured to have three or more use positions.

Figures 5A, 5B:
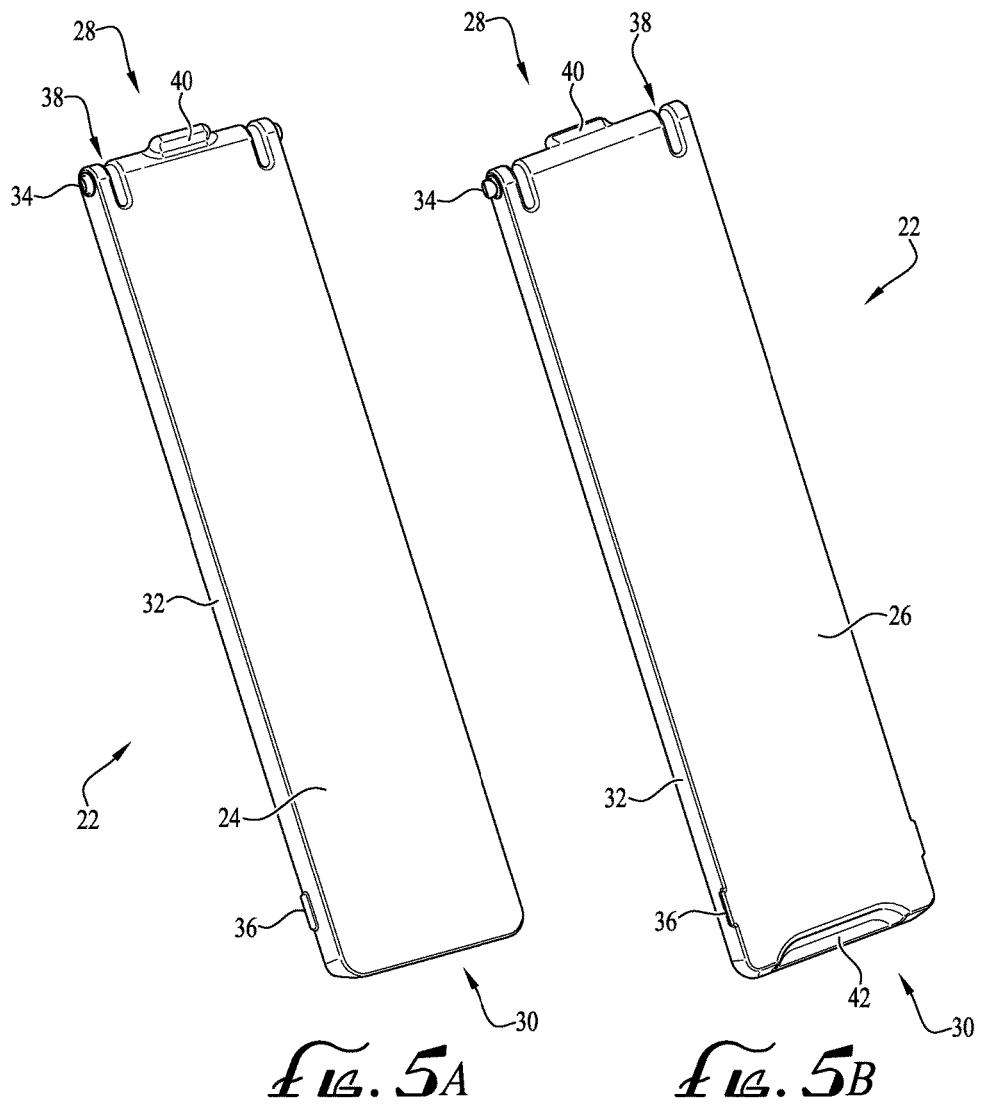
FIG. 5A is a perspective view of the front of the support stand arm of FIG. 1.
FIG. 5B is a perspective view of the back of the support stand arm of FIG. 1.

The support stand case 10 generally includes a support stand arm 22, shown in FIGS. 5A-B, attached to a support stand base 18, shown in FIGS. 6A-B. In the depicted embodiment, the support stand base 18 is formed in the back panel 14 of the electronic device case 12 and the arm 22 is pivotally attached to the support stand base. In example embodiments, the support stand arm 22 is formed from a rigid polymer. In other embodiments, the support stand arm 22 is formed of another hard plastic, metal, composite, polymeric, ceramic and/or other material(s) of construction. In example embodiments, the support stand arm 22 is formed through injection molding. In other embodiments, the support stand arm 22 is formed through another manufacturing process.

The support stand arm 22 is generally an elongate body configured to support the electronic device case 12 at an angle against a support surface. In the depicted embodiment, the arm 22 is formed from a rectangular panel having a front face 24, a back face 26, a top end 28, a bottom end 30, and two sidewalls 32. In alternate embodiments, the support stand arm 22 can be another shape including a straight or curved rod or a non-rectangular panel. The support stand arm 22 generally includes an attachment feature 34 for moveable attachment to the support stand base 18 and a positioning feature 40 for holding the arm in one of the at least two use positions.

In the example embodiment, the attachment feature 34 includes attachment hubs configured to pivotally attach the support stand arm 22 to the base 18. In the depicted embodiment, each attachment hub 34 is positioned on a sidewall 32 of the arm 22 adjacent the top end 28 such that the arm pivots or rotates about the top end. The hubs 34 have a cylindrical body to facilitate rotation of the arm 22. The ends of the attachment hubs 34 can be angled as shown in FIG. 5A. The arm 22 can optionally include slots 38 adjacent to the attachment hubs 34 configured to facilitate push fitting the attachment hubs into engagement with the support stand base 18. In the depicted embodiment, the slots 38 extend into the top end 28 of the arm 22 generally parallel to the sidewalls 32. Each slot 38 is configured to allow the portion of the sidewall 32 with the attachment hub 34 to be bent toward the center of the support stand arm 22. This flexibility allows the attachment hubs 34 to be snap fitted into the support stand base 18 as described below. In other embodiments, other attachment features can be used. For example, the arm can include a bore or channel configured to receive a pin.

In the example embodiment, the positioning feature 40 includes a positioning rib that extends outward from top end 28 of the front face 24 of the support stand arm 22, as shown in FIG. 5A. The positioning rib 40 is positioned to point upward and outward when the support stand arm 22 is in the storage position. In the depicted embodiment, the top end 28 of the arm 22 is rounded to facilitate the pivotal motion of the arm and the positioning rib 40 is located on the rounded portion of the top end. The positioning rib 40 is configured to engage with the support stand base 18 to hold the support stand 22 in each of the plurality of use positions. In alternate embodiments, other positioning features can be used such as a cam or ratchet mechanism.

The support stand arm 22 can, optionally, also include a retaining feature 36 configured to releasably hold the arm in the storage position. In the example embodiment, the arm 22 includes a pair of retaining flanges 36 configured to releasably engage reciprocal features on the support stand base 18. The retaining flanges 36 extend outward from each sidewall 32 along the back face 26, as shown in FIG. 5B. In the depicted embodiment, the retaining flanges 36 are positioned adjacent to the bottom end 30 of the support stand arm 22. In alternate embodiments, other retaining features can be used including magnets or hook and loop fasteners.

The support stand arm 22 can optionally include a gripping feature 42 configured to provide a ledge or surface to assist the user in pulling the support stand arm 22 from the storage position and moving it toward a use position. In the depicted embodiment, the gripping feature 42 is a grove 42 cut into the back face 26 at the bottom end 30 of the arm. The grove 42 is configured to provide a gripping surface to assist a user in pulling the support stand arm from storage position to a use position.

Figure 4:
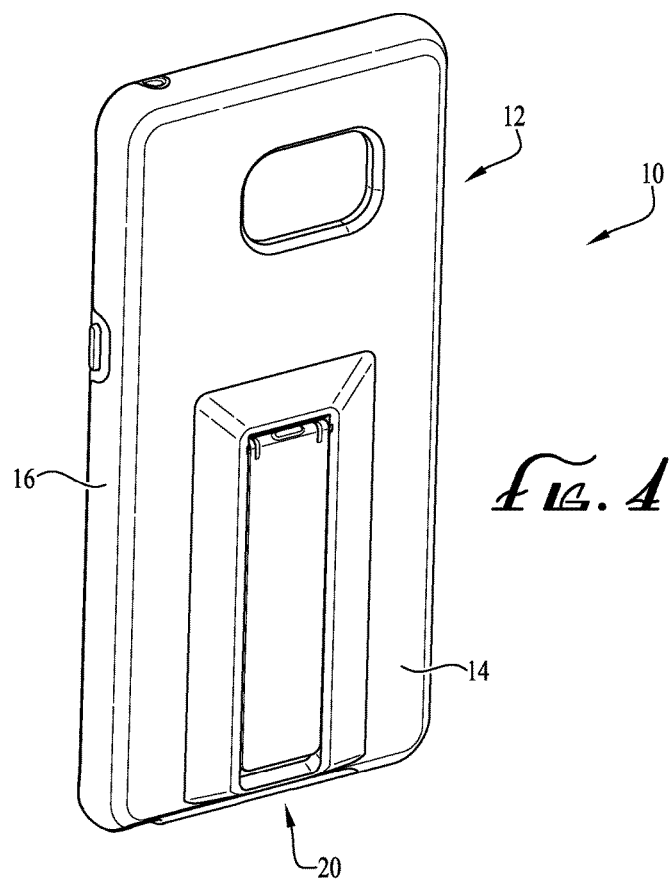
FIG. 4 is a perspective view of the portable electronics case with support stand of FIG. 1, where the support stand is in a storage position.

The support stand base 18 is generally a recess 50 in the back panel 14 of the electronic device case 12 configured to receive the support stand arm 22 in the storage position. In the depicted embodiment, the recess 50 has a rectangular cross section to match the shape of the support stand arm 22 such that the support stand arm fits within the recess in the storage position, as shown in FIG. 4. In the depicted embodiment, the depth of the recessed area 50 is equal to at least the thickness of the support stand arm 22 such that the support stand arm does not extend beyond the back panel 14 of the electronic device case 12 when in the storage position. In alternate embodiments, the depth of the recessed area 50 is less than the thickness of the support stand arm 22 and the support stand arm extends beyond the back panel 14 of the electronic device case 12 when in the storage position. In alternate embodiments, the support stand base 18 does not include a recessed area 50 and the support stand base and support stand arm 22 are attached a top the back panel 14 of the electronic device case.

The support stand base 18 of the depicted embodiment includes a rectangular recessed area 50 in the back panel 14 of the electronic device case 12. The recessed area 50 is generally the same cross section as the support stand arm 22. Optionally, the back panel 14 of the electronic device case 12 includes a raised area 52 around the recessed area 50 to accommodate the support stand arm 22. The raised area 52 can be tapered as shown in FIG. 6A. The recessed area 50 includes a back wall 54, a top end wall 56, a bottom end wall 58, and sidewalls 60. The support stand base 18 generally includes an attachment receiver 62 for movable attachment to the support stand arm 22 and a plurality of positioning features 66, 68 configured to hold the support stand arm in the at least two use positions.

In the example embodiment, the attachment receiver 62 is formed from attachment slots in each sidewall 60. The attachment slots 62 are positioned adjacent the top end wall 56 of the recessed area 50 and are configured to receive the attachment hubs 34 of the support stand arm 22. In the depicted embodiment, the attachment slots 62 include a curved upper wall which allows the cylindrical body of the attachment hubs 34 to rotate within the attachment slots, creating a pivotal attachment. In example embodiments, the attachment hubs 34 are push fitted into the attachment slots 62 as shown in FIG. 6B. In alternate embodiments, other attachment means are used.

In the example embodiment, the positioning features are formed from two channels 66, 68 in the recessed area. The channels 66, 68 are configured to receive the positioning rib 40 of the support stand arm 22 to releasably hold the arm at an angle relative to the back panel 14 of the electronic device case 12. In the depicted embodiment, the first channel 66 is formed in the top end wall 56 of the recess 50 and the second channel 68 is formed in the back wall 54 of the recess. The channels 66, 68 are positioned such that as the support stand arm 22 is pivoted about the attachment hubs 34 and attachment slots 62, the positioning rib 40 engages the channels. The channels 66, 68 are configured to generally hold the positioning rib 40 in releasable engagement until the user provides sufficient pivotal force to push the positioning rib out of engagement with the channel. In alternate embodiments, the support stand base 18 can include three or more positioning channels to create three or more use positions. In alternate embodiments, other types of positioning features can be used.

The support stand base 18 can, optionally, include a retaining feature 64 configured to releasably hold the support stand arm 22 in the storage position. In the example embodiment, the recess 50 includes a retaining lip 64 on each sidewall 60. The retaining lips 64 are positioned adjacent to the bottom end wall 58 of the recessed area 50 and are configured to releasably engage the retaining flanges 36 of the support stand arm 22 in the storage position. When the support stand arm 22 is moved to the storage position, the retaining flanges 36 are push fitted over the retaining lips 64. In alternate embodiments, other mechanisms are used to releasable hold the arm 22 in the storage position.

FIGS. 7A-C show the support stand case 10 with the support stand 20 in the storage position. As described above, in the storage position, the support stand arm 22 is positioned within the recess 50. In the depicted embodiment, the length of the recess 50 is such that there is a gap between the bottom end wall 58 of the recessed area and the bottom end 30 of the support stand arm 22. This space or gap allows a user access to the engagement feature or groove 42 at the bottom end 30 of the support stand arm 22. The bottom end wall 58 can also be angled relative to the back wall 58 to facilitate pulling of the support stand arm 22. In the depicted embodiment, the top end wall 56 of the recess 50 is also angled to accommodate the positioning rib 40 of the support stand arm 22. In the storage position, the positioning feature or rib 40 is not engaged with a channel 66, 68 in the support stand base 18, as shown in FIG. 7B. In example embodiments, the support stand arm 22 is retained in the support stand base 18 in the storage position using retaining flanges 36 of the support stand arm and the retaining lips 64 of the recessed area 50, as shown in FIG. 7C. To move the support stand arm 22 from the storage position to a use position, the arm is extended away from the back panel 14 of the electronic device case 12. The arm 22 is pivoted about the attachment feature 36 until the positioning rib 40 engages a positioning channel 66 to hold the arm in the first use position.

FIGS. 8A and 8B show the support stand case 10 with the support stand 20 in a first use position. In this first use position, the electronic device can be supported against a support surface in a vertical portrait mode. The positioning rib 40 is engaged with the first positioning channel 66 to hold the arm 22 in the first use position. In the depicted embodiment, the angle formed between the support stand arm 22 and the back panel 14 of the electronic device case 12 in the first use position is acute. In example embodiments, the angle is between about 5° and about 90°. In other embodiments, the angle is between about 20° and about 70°. In still other embodiments, the angle is between about 35° and about 55°. In alternate embodiments, the angle of the first use position can be larger or smaller. The first positioning channel 66 is configured such that the positioning rib 40 can be disengaged from the positioning channel if the arm 22 is rotated towards or away from the back panel 14 with sufficient force. To move the support stand arm 22 from the first use position to the next use position, the arm is extended further away from the back panel 14 of the electronic device case 12. The arm 22 is pivoted about the attachment feature 36 until the positioning rib 40 engages the next positioning feature 68 on the support stand base 18.

Figure 9A:
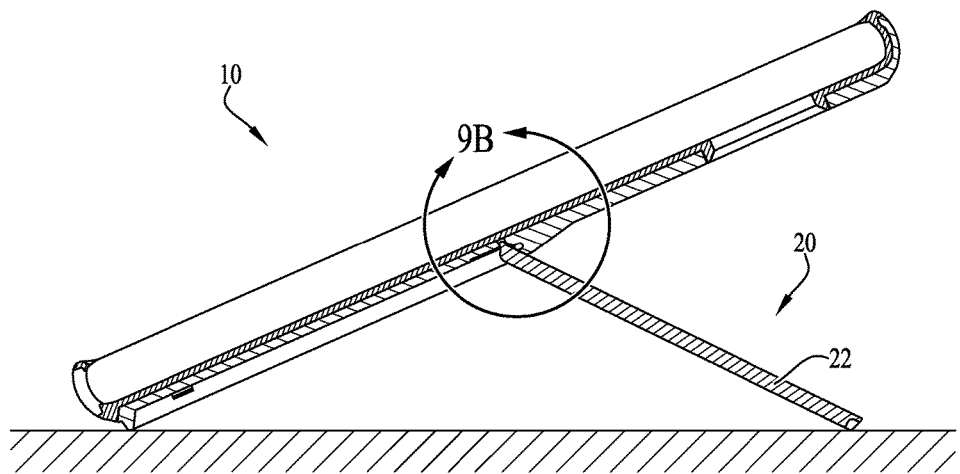
FIG. 9A is a cut-away side view of the portable electronics case with support stand of FIG. 2.
Figure 9B:
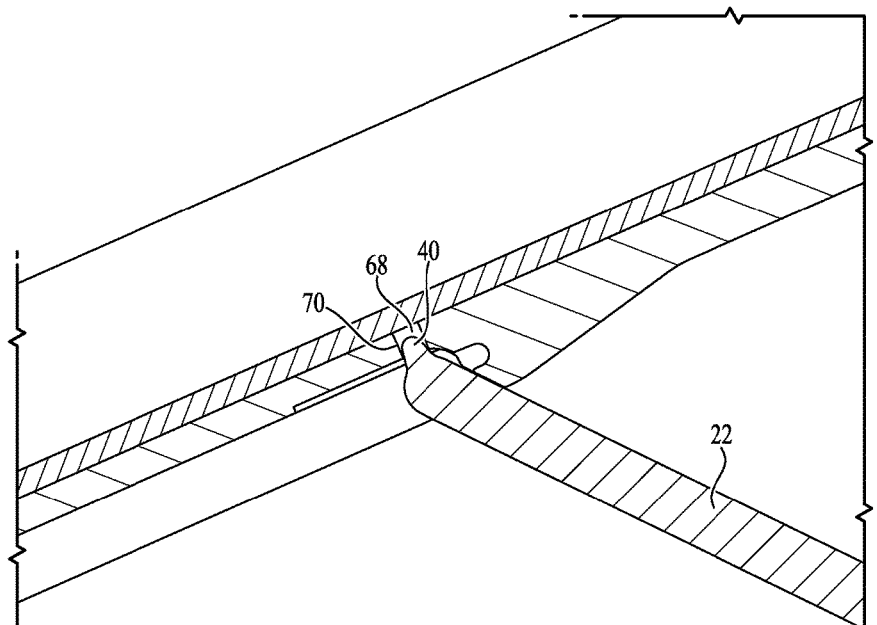
FIG. 9B is a detailed view of the portable electronics case with support stand of FIG. 9A.
Figure 10A:
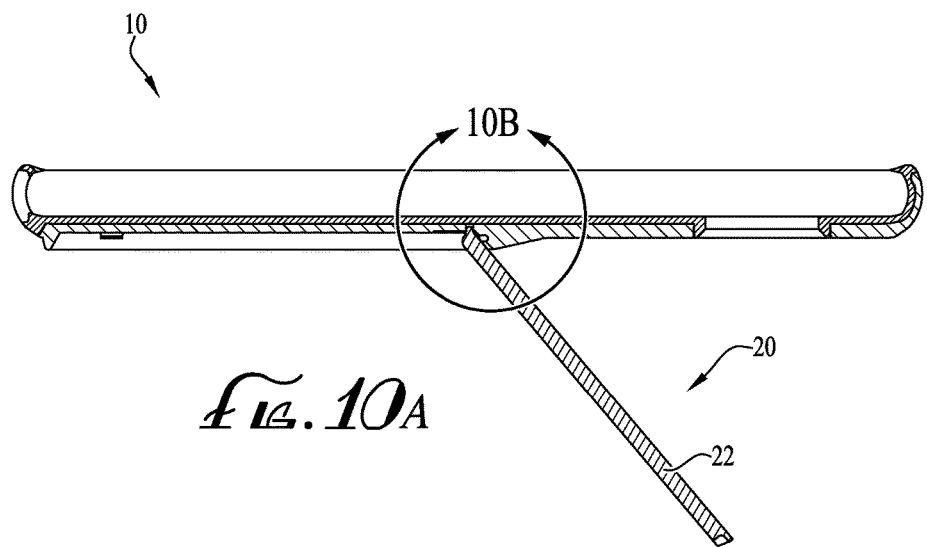
FIG. 10A is a cut-away top view of the portable electronics case with support stand of FIG. 3.
Figure 10B:
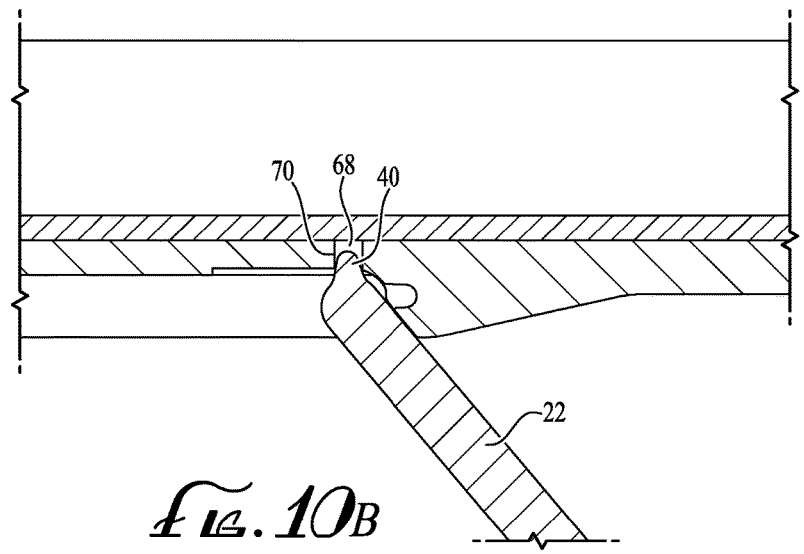
FIG. 10B is a detailed view of the portable electronics case with support stand of FIG. 10A.

FIGS. 9-10 show the support stand case 10 with the support stand 20 in a second use position. In the second use position of the depicted embodiment, the electronic device can be supported against a support surface in both a horizontal portrait mode, as shown in FIGS. 9A and 9B, and in a landscape mode, as shown in FIGS. 10A and 10B. In the horizontal portrait mode, generally the width of the support stand arm 22 rests against the support surface. In the landscape mode, generally a corner of the support stand arm 22 rests against the support surface. In the second deployed position, the positioning rib 40 is engaged with the second positioning channel 66 to hold the arm 22 in the second use position. In the depicted embodiment, the angle formed between the support stand arm 22 and the back panel 14 of the electronic device case 12 in the second use position is obtuse. In example embodiments, the angle is between about 90° and about 175°. In other embodiments, the angle is between about 110° and about 160°. In still other embodiments, the angle is between about 125° and about 145°. In alternate embodiments, the angle of the second use position can be larger or smaller. The second positioning channel 68 is configured such that the positioning rib can be disengaged from the channel if the arm is rotated towards the back panel 14 with sufficient force. The second or last positioning channel 68 can optionally include stop surface 70 configured to stop the arm 22 from rotating away from the back panel 14 past where the positioning rib 40 engages the last channel. In alternate embodiments, a plurality of use positions can be used with a variety of support angles between the support stand arm 22 and the back panel 14 of the electronic device case 12.

Figure 11:
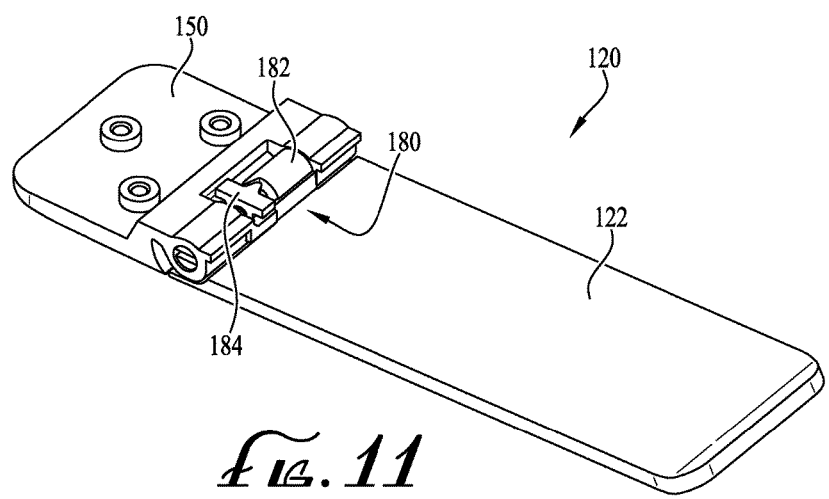
FIG. 11 is a perspective view of a support stand for a portable electronics case according to another example embodiment of the invention.
Figures 12, 13:
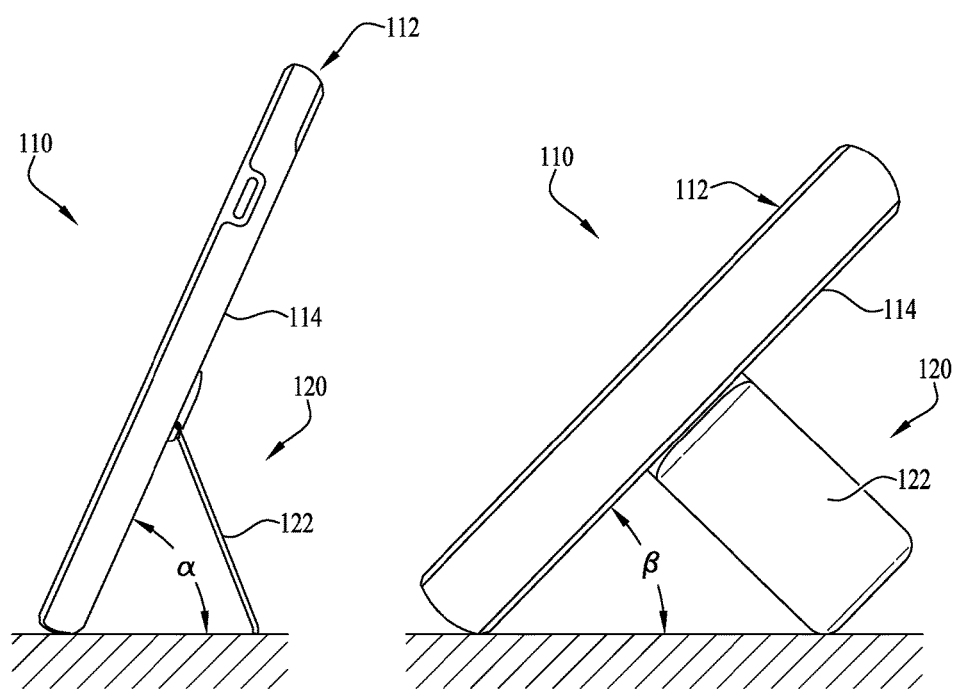
FIG. 12 is a side view of a portable electronics case with the support stand of FIG. 11, where the support stand is in a use position and the portable electronics case is in portrait orientation.
FIG. 13 is a side view of a portable electronics case with the support stand of FIG. 11, where the support stand is in a use position and the portable electronics case is in landscape orientation.

FIGS. 11-18 show a support stand 120 for an electronic device case 110 according to another example embodiment of the present invention. The support stand 120 generally includes a support stand arm 122 pivotally coupled to a support stand base 150 which is configured to releasably hold the support stand arm in either a storage position, as shown in FIG. 11, or a use position, as shown in FIGS. 12 and 13. In the use position, the support stand 120 can support a portable electronic device in either a vertical portrait mode, as shown in FIG. 12, or a landscape mode, as shown in FIG. 13. The support stand base 150 is generally attached to the back or base panel 114 of an electronic device case 112. In example embodiments, the electronic device case 112 can include a recessed area similar to the previous embodiment. In alternate embodiments, the support stand arm 122 and support stand base 150 are positioned on top of the back panel 114 of the electronic device case 112. The support stand 120 can be formed from a rigid material including metal or plastic. In the depicted embodiment, the support stand 120 is mounted to the electronic device case 112 such that the support stand arm 122 is parallel with the length of the electronic device case. In alternate embodiments, the support stand 120 is mounted to the electronic device case 112 such that the support stand arm 112 is perpendicular to the length of the electronic device case.

In example embodiments, the support stand arm 122 is deployed to an angle of between about 35° to about 55° relative to the back panel 114 of the electronic device case 112 when in use. In preferred embodiments, the angle between the support stand arm 122 and the back panel 114 when the support stand 120 is in a use position is around 45°. In the use position, the support stand 120 can support the electronic device case 112 on a support surface in a vertical portrait position, as shown in FIG. 12. In the vertical portrait position, the length of the electronic device case 112 and the support surface form an angle α. In example embodiments, the angle α is between about 50° and about 75°. In preferred embodiments, the angle α is between about 60° and about 65°. In the use position, the support stand 120 can also support the electronic device case 112 in a landscape position, as shown in FIG. 13. In the landscape position, the width of the electronic device case 112 and the support surface form an angle β. In example embodiments, the angle β is between about 35° and about 55°. In preferred embodiments, the angle β is around 45°. In alternate embodiments, the support stand 120 can have multiple use positions as in the previous embodiment. The multiple use positions can create support angles α, β between about 0° and about 180°.

In the example embodiment, the support stand 120 includes a positioning mechanism 180 for releasably holding the support stand arm 122 in a storage or use position. The positioning mechanism 180 generally includes a rotating engagement cam 182 and a translating engagement cam 184, whereas the rotating engagement cam is configured to releasably engage the translating engagement cam to releasably hold the support stand arm 122 in either a storage or use position. In the depicted embodiment, the rotating engagement cam 182 is formed on the support stand arm 122. In alternate embodiments, other configurations of the rotating engagement cam 182 and the translating engagement cam 184 can be used.

Figure 14A:
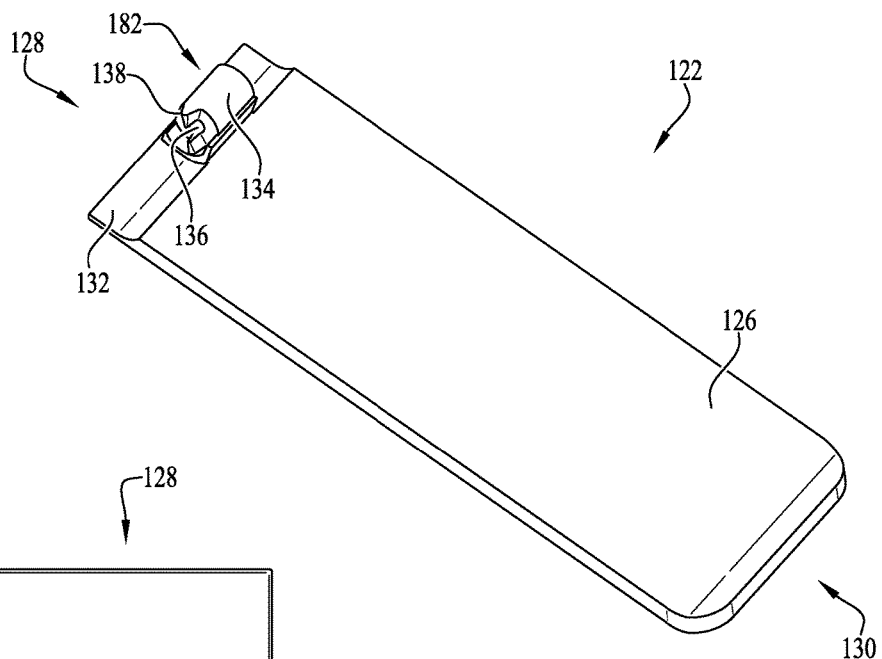
FIG. 14A is a perspective view of the back of the arm of the support stand of FIG. 11.
Figure 14B:
FIG. 14B is a front view of the arm of the support stand of FIG. 11.

The support stand arm 122, shown in FIGS. 14A and 14B, is generally an elongate body configured to support the electronic device case 112 at an angle against a support surface. In the depicted embodiment, the arm 122 is formed from a rectangular panel having a front face 124, a back face 126, a top end 128, and a bottom end 130. In alternate embodiments, the support stand arm 122 can be another shape including a straight or curved rod or a non-rectangular panel. In the example embodiment, the back face 126 of the arm 122 generally includes a tapered area 132 at the top end 128 such that the thickness of the arm at the top end is less than the majority of the arm. In the depicted embodiment, the tapered area 132 is curved, such that the top end 128 of the arm 122 can pivot around a cylindrical or curved surface on the support stand base 150, discussed further below. In alternate embodiments, the top end 128 of the arm 122 is not tapered. The top end 128 of the arm 122 includes the rotating engagement cam 182 configured to engage with the translating engagement cam 184.

In the example embodiment, the rotating engagement cam 182 is fixed to the support stand arm 122 such that the rotating cam rotates as the support stand arm rotates about the support stand base 150. The rotating cam 182 is attached to the tapered area 132 on the back face 126 of the support stand arm 122. The rotating engagement cam 182 is includes a cylindrical body 134 with a bore or channel 136 extending through the cylindrical body. The rotating cam 182 also includes an engagement feature 138 configured to engage a reciprocal feature on the translating engagement cam 184. In the depicted embodiment, the engagement feature 138 includes two teeth protruding from an end of the cylindrical body 134 of the rotating cam 182. The teeth 138 are positioned in between the bore 136 and the outer circumference of the cylindrical body 134. In alternate embodiments, three or more teeth 138 are used to correspond to a plurality of use positions. In other embodiments, other engagement features are used.

Figure 15A:
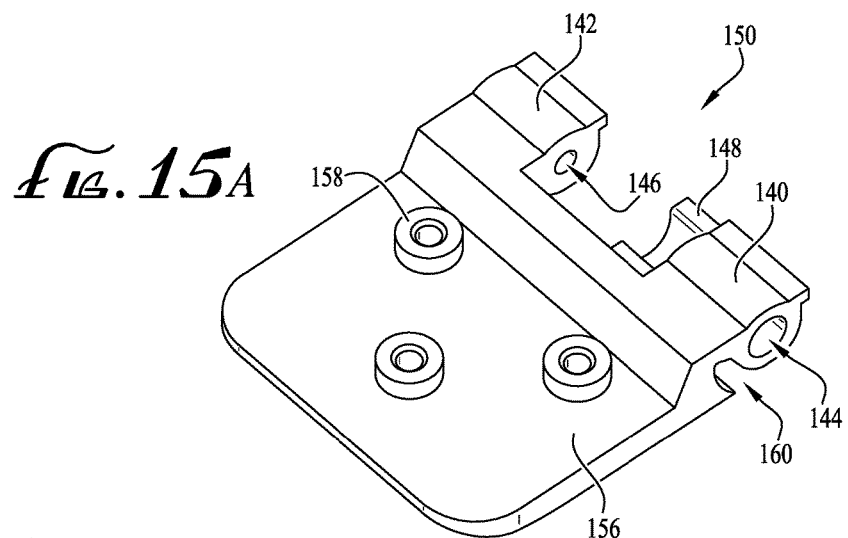
FIG. 15A is a perspective view of the back of the base of the support stand of FIG. 11.
Figure 15B:
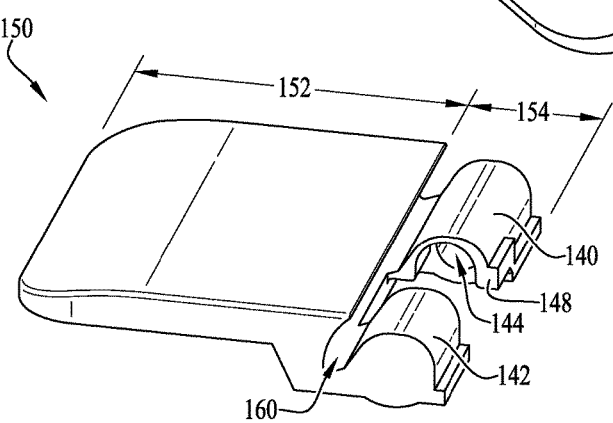
FIG. 15B is a perspective view of the front of the base of the support stand of FIG. 11.

The support stand base 150, shown in FIGS. 15A-15B, generally includes an attachment portion 152, configured for attachment to the back panel of the electronic device case 112, and an arm receiving portion 154, configured for pivotal engagement with the support stand arm 122. The back side 156 of the attachment portion 152 has a generally flat attachment surface. In example embodiments, the attachment surface 156 is attached to the back panel 114 of the electronic device case 112. In the depicted embodiment, the attachment surface 156 includes a plurality of attachment features 158 configured to engage with reciprocal features on the electronic device case 112. In alternate embodiments, the support stand base 150 is attached to the back panel 114 using other attachment means include an adhesive or welding. In other embodiments, the support stand base 150 is formed in the back panel 114 of the electronic device case 112 such that the back panel and the support stand base form a unitary piece.

The arm receiving portion 154 includes substantially cylindrical end portions 140, 142 at either end of the arm receiving portion. The first end portion 140 includes a bore or channel 144 extending through the cylindrical portion. The second end portion 142 includes a bore extending at least partially through the cylindrical portion. In between the end portions 140, 142 is a semi-circular collar 148 for receiving or cradling the translating engagement cam 184 described below. In the depicted embodiment, the collar 148 extends from an end of the cylindrical first end portion 140. There is a space between the collar 148 and the second end portion 142 for receiving the rotating engagement cam 182 on the support stand arm 122. The support stand base 150 can also include a gap or slot 160 in between the attachment portion 152 and the arm receiving portion 154. The gap 160 allows the top end 128 of the support stand arm 122 to rotate over and around the arm receiving portion 154.

Figure 16:
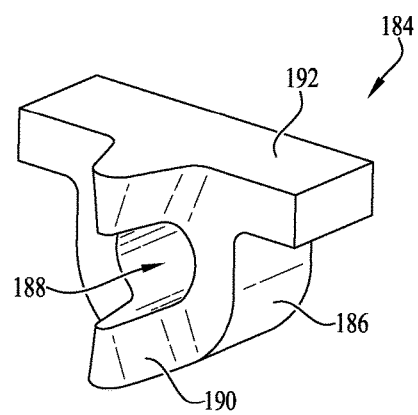
FIG. 16 is a perspective view of the translating engagement cam of the support stand of FIG. 11.

The translating engagement cam 184, shown in FIG. 16, includes a cylindrical body 186 with a bore or channel 188 extending through the cylindrical body. Similar to the rotating engagement cam 182, the translating engagement cam 184 includes an engagement feature 190. In the depicted embodiment, the engagement feature includes two teeth 190 protruding from an end of the cylindrical body 186. The teeth 190 are positioned in between the bore 188 and the outer circumference of the cylindrical body 186. The translating cam 184 also includes a flange 192 configured to engage with the arm receiving portion 154 of the support stand base 150. The flange 192 is configured to prevent the translating cam 184 from rotating. The translating cam 184 can be formed from a rigid material including metal or rigid plastic. The translating cam can be die case, injection molded, or cut from a block of material.

Figure 17A:
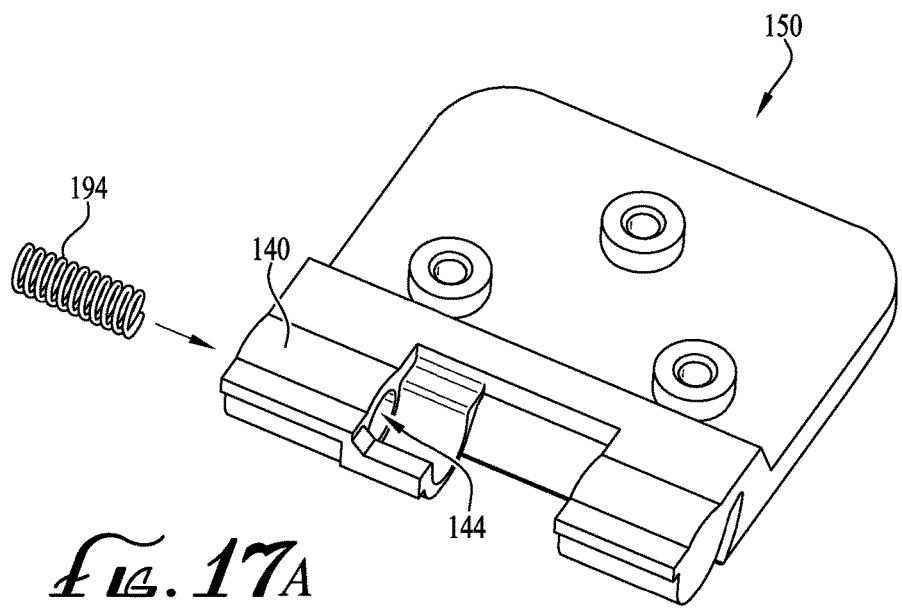
FIGS. 17A-D are exploded views showing the assembly of the support stand of FIG. 11.
Figure 17B:
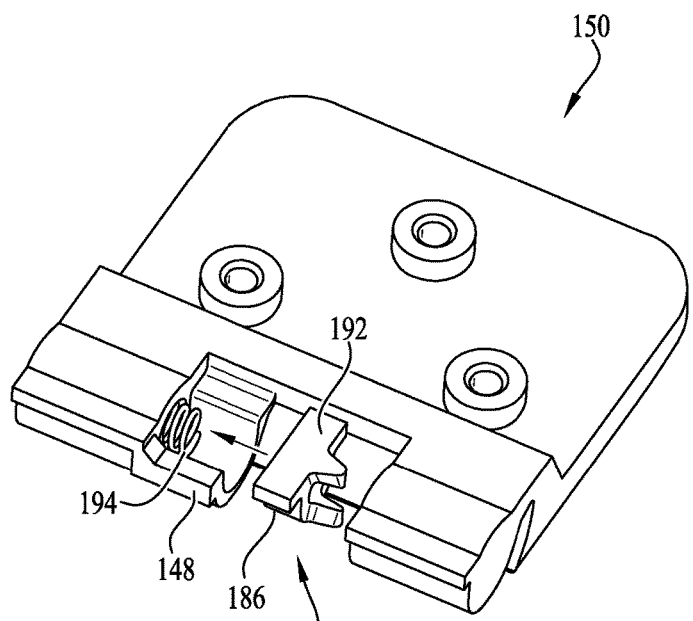
Figure 17C:
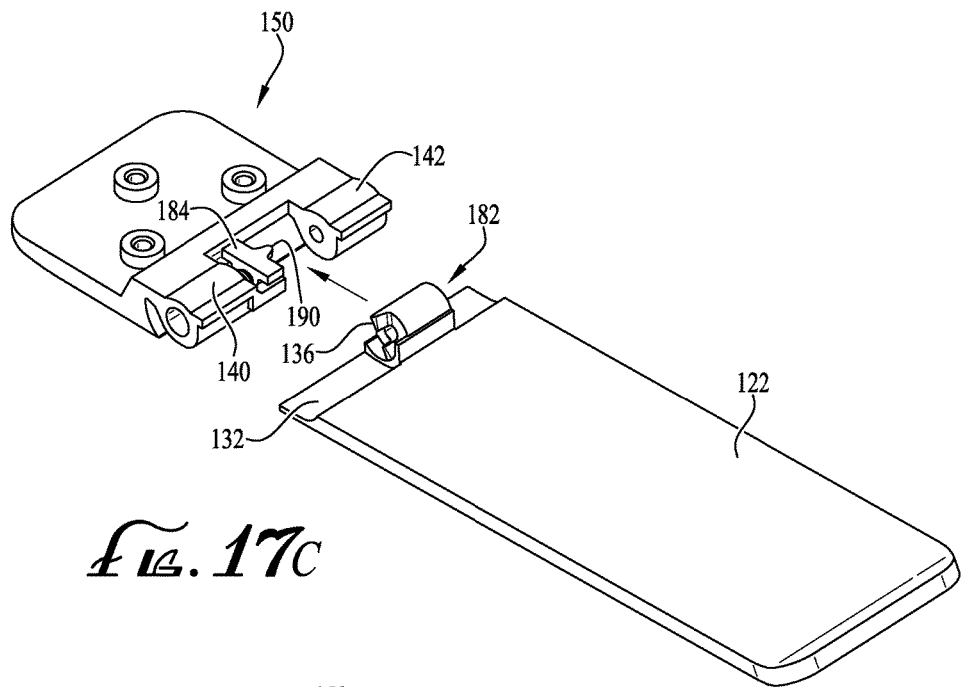
Figure 17D:
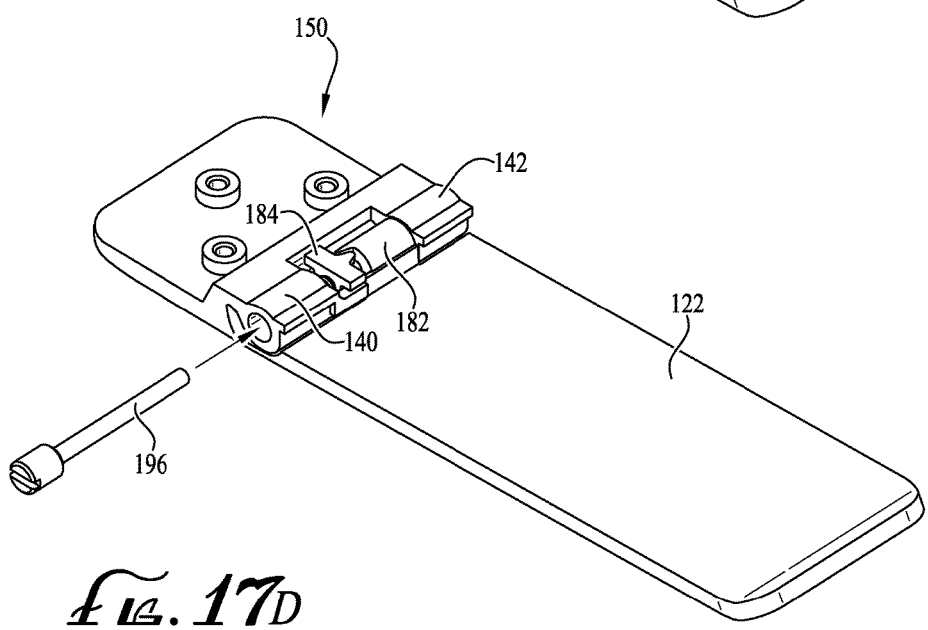

FIGS. 17A-D illustrate a method of assembly for the support stand 120. A biasing spring 194 is inserted into the bore 144 in the first end portion 140 of the support stand base 150, as shown in FIG. 17A. The biasing spring 194 is configured to bias the translating engagement cam 184 into engagement with the rotating engagement cam 182. The translating engagement cam 184 is inserted into the semi-circular collar 148 in the support stand base 150, as shown in FIG. 17B. The translating cam 184 is positioned such that the cylindrical body 186 is within the collar 148 and the flange 192 rests on top of the collar. The teeth 190 of the translating cam 184 are facing away from the first end portion 140 of the base 150. The support stand arm 122 is positioned such that tapered portion 132 of the arm extends around the cylindrical end portions 140, 142 of the support stand base 150 and the rotating cam 182 is positioned in between the translating cam 184 and the second end portion 142, as shown in FIG. 17C. The rotating cam 182 is positioned such that the teeth 136 of the rotating cam engage the teeth 190 of the translating cam 184. In the depicted embodiment, a pin 196 is inserted through the bores or channels in the first end portion 140, the translating cam 184, the rotating cam 182 of the support stand arm 122, and second end portion 142 to attach the arm to the base 150. In example embodiments, the pin 196 can include a threaded portion configured to engage with reciprocal threads in the bore of one or both of the end portions 140, 142.

FIGS. 18A-C show the method of operation of the support stand 120. When the support stand 120 is in the storage position, as shown in FIG. 18A, the support stand arm 122 is generally parallel with the attachment surface 156 of the support stand base 150 and the translating cam 184 is spring biased into engagement with the rotating cam 182. When the arm 122 is rotated away from the electronic device case (not pictured) with sufficient force, as shown in FIG. 18B, the rotating cam 182 rotates in relation to the translating cam 184. The teeth 136 of the rotating cam 182 slide along the teeth 190 of the translating cam 184, pushing the translating cam back against the biasing spring 194 toward the first end portion 140 of the support stand base 150. The translational motion of the translating cam 184 allows it to disengage from the rotating cam 182 and the support stand arm 122 is able to move from the storage position to the use position, shown in FIG. 18C. In the use position, the biasing spring 194 pushes the translating cam 184 back into engagement with the rotating cam 182. The support stand arm 122 is held in the use position until the arm is rotated toward the electronic device case, which repeats the process described above. In other embodiments, the cams 182, 184 each include three or more teeth allowing the support stand arm 122 to be held in a plurality of use positions.

FIGS. 19-26 show a support stand 220 for an electronic device case according to another example embodiment of the present invention. The support stand 220 generally includes a support stand arm 222 pivotally coupled to a support stand base 250 which is configured to releasably hold the arm in either a storage or use position, as in the previous embodiment 120. The support stand arm 222, shown in FIG. 20, is substantially similar to the support stand arm 120 of the previous embodiment. The translating engagement cam 284 is substantially similar to that of the previous embodiment. The support stand arm 222 includes an elongate body with a rotating cam 282 fixed to the top end 228 of the back face 226 of the arm. However, in this embodiment, the rotating cam 282 is formed from a rectangular body 234 rather than the cylindrical body 134 of the previous embodiment. In the depicted embodiment, the corners of the rectangular body 234 are rounded.

Figure 21A:
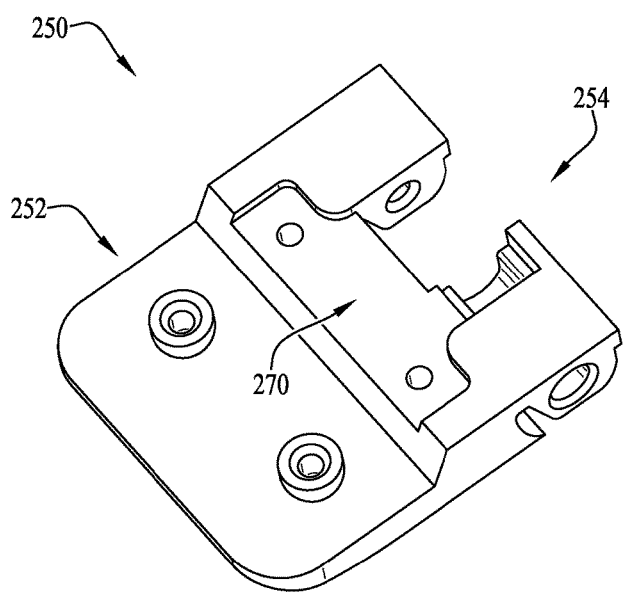
FIG. 21A is a perspective view of the back of the base of the support stand of FIG. 19.
Figure 21B:
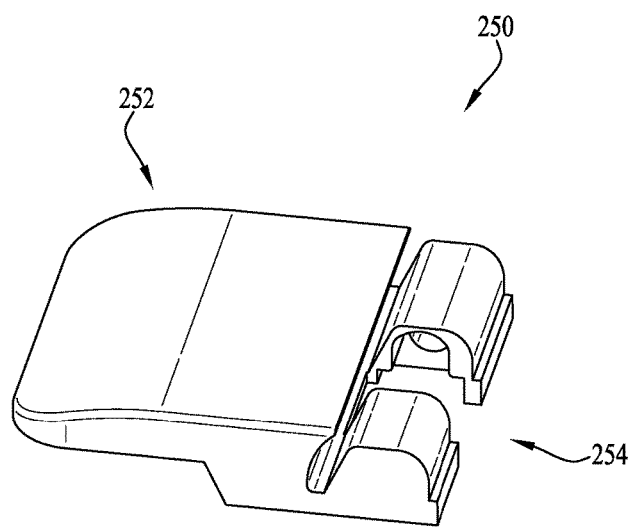
FIG. 21B is a perspective view of the front of the base of the support stand of FIG. 19.

The support stand base 250, shown in FIGS. 21A-21B, includes an attachment portion 252 and an arm receiving portion 254 similar to the previous embodiment. However, in the depicted embodiment, the back of the arm receiving portion 254 includes a recess 270 positioned in the base 250 above the gap for receiving the rotating engagement cam 282. In the depicted embodiment, the recess 270 is T-shaped but in other embodiments, a different shaped recess can be used. The recess 270 is configured to receive and hold a positioning leaf spring 272, shown in FIG. 23. In the depicted embodiment, the leaf spring 272 is T-shaped, having a similar cross-section as the recess 270 in the support stand base 250. In alternate embodiments, other shaped leaf springs can be used. The leaf spring 272 is configured to attach to the support stand base 250 such that at least a portion of the leaf spring is within the recess 270. In the depicted embodiment, the leaf spring 272 includes holes 274 for attaching the leaf spring to the base 250 with screws or pins. In alternate embodiments, other attachment means are used. In alternate embodiments, the base 250 does not include a recess, and the leaf spring 272 attaches directly to the bottom of the base.

Figure 24C:
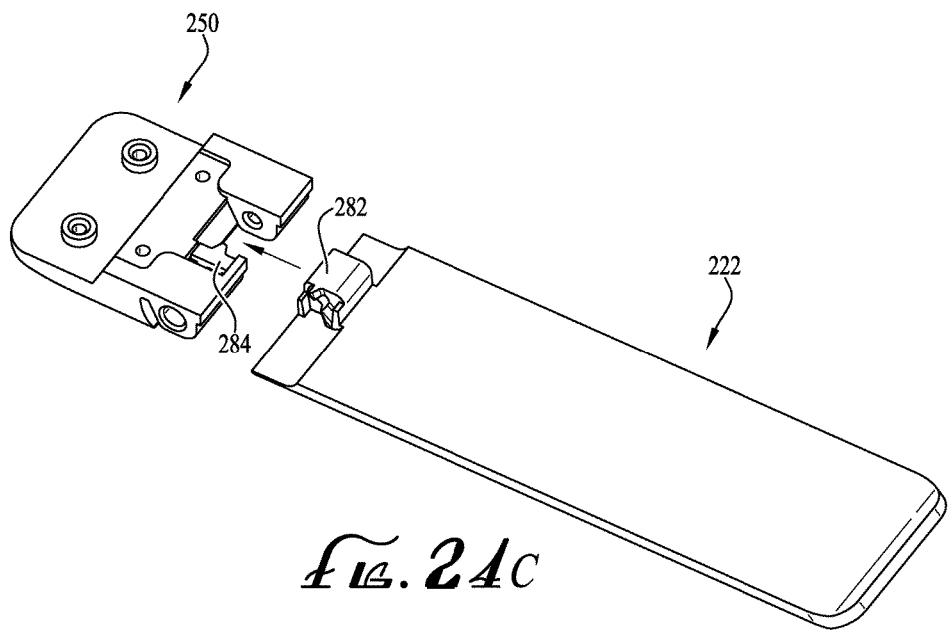
Figure 24D:
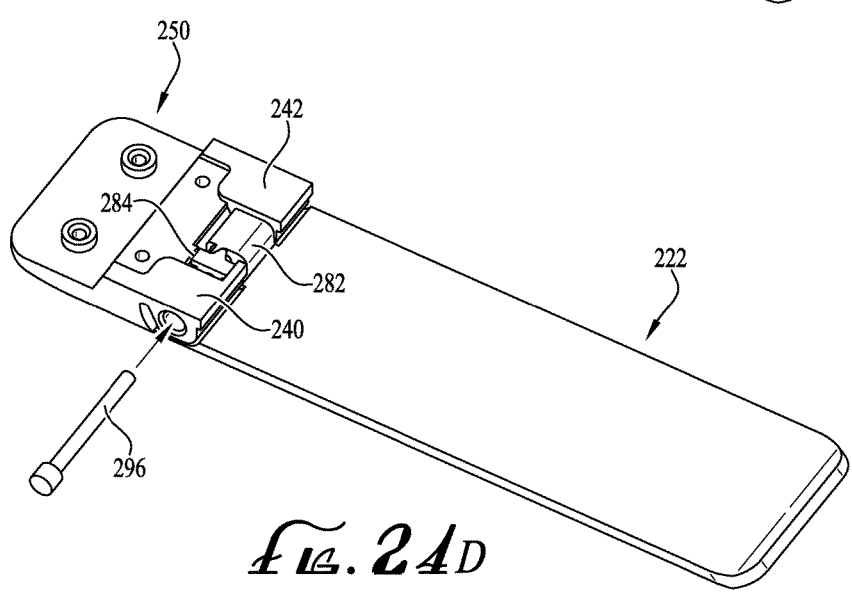
Figure 24E:
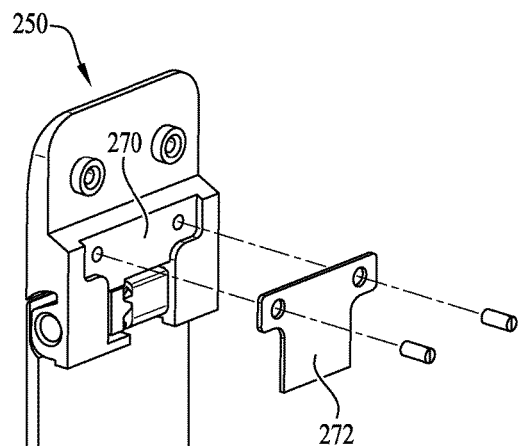
Figure 25:
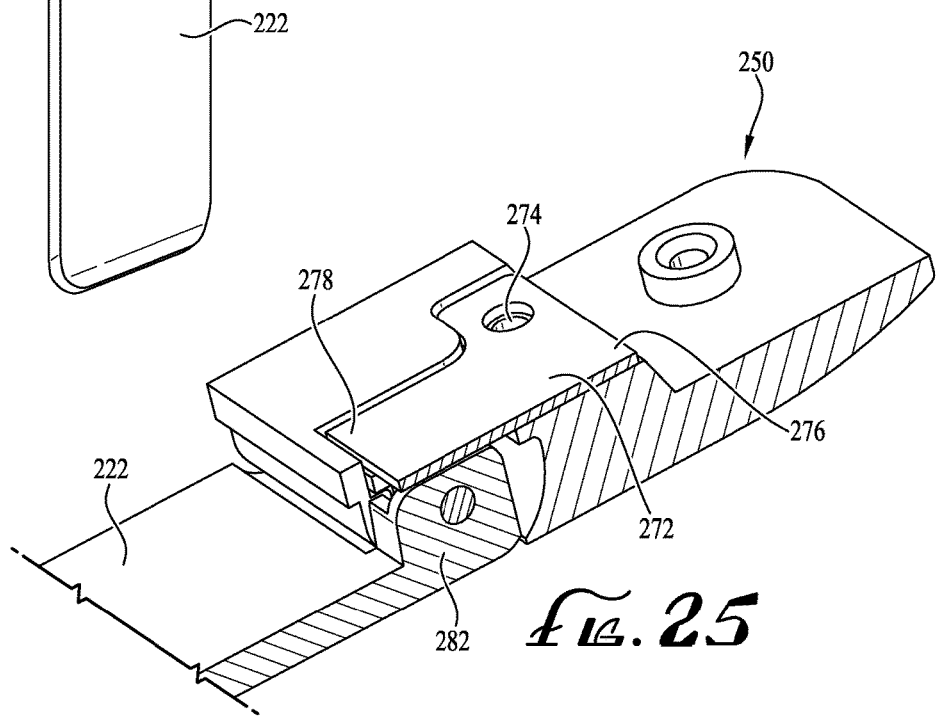
FIG. 25 is a detailed cut-away view of the support stand of FIG. 19.

FIGS. 24A-E illustrate a method of assembly for the support stand 220. The translating engagement cam 284 is inserted into the semi-circular collar 248 as in the previous embodiment. A biasing spring (not shown) can optionally be used in the depicted embodiment, as in the previous embodiment. The support stand arm 222 is positioned such that the rotating cam 282 is positioned in between the translating cam 284 and the second end portion 242, as shown in FIG. 24C. A pin 296 is inserted through the bores or channels in the first end portion 240, the translating cam 284, the rotating cam 282 of the support stand arm 222, and second end portion 242 to attach the arm to the base 250, as shown in FIG. 24D. In this embodiment, the leaf spring 270 is attached to the support stand base 250 as a final step in the assembly process, shown in FIG. 24E.

Figure 26A:
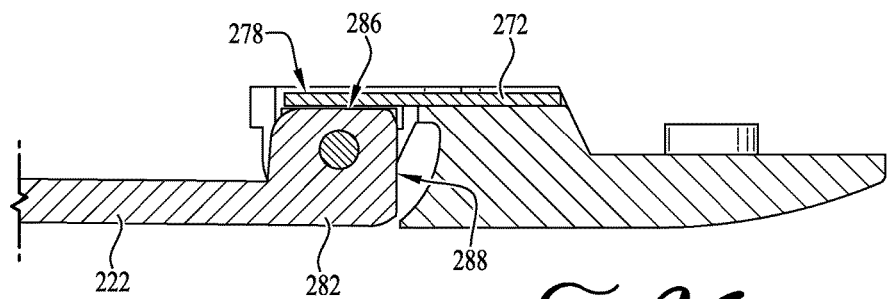
FIG. 26A is a detailed cut-away view of the support stand of FIG. 19 in a stored position.
Figure 26B:
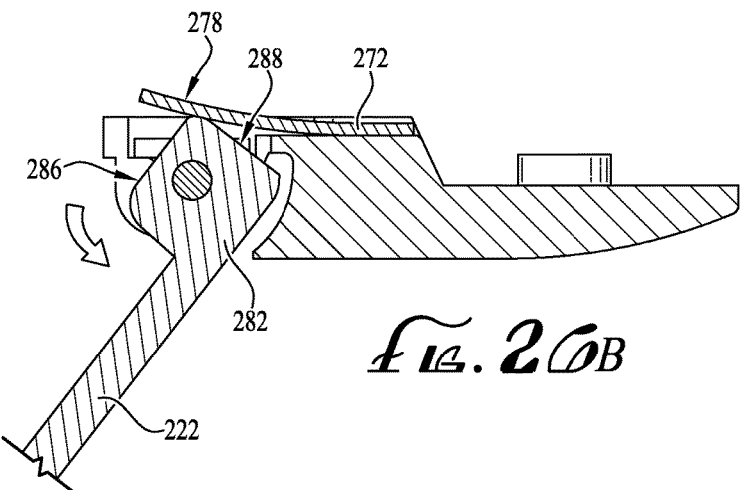
FIG. 26B is a detailed cut-away view of the support stand of FIG. 19 in an intermediate position.
Figure 26C:
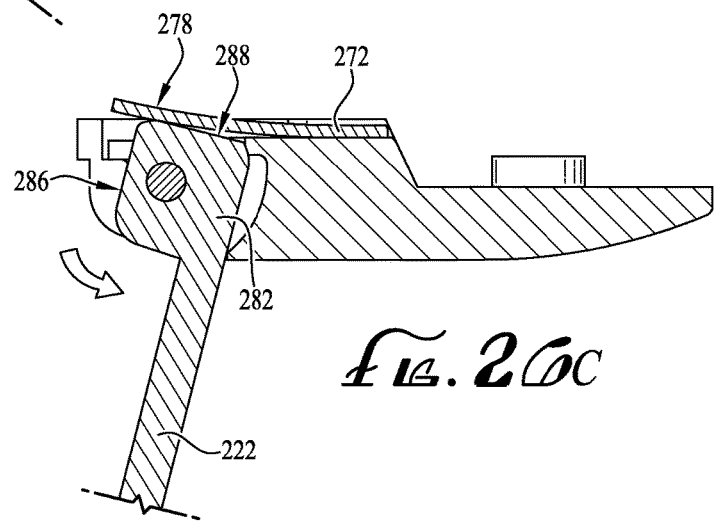
FIG. 26C is a detailed cut-away view of the support stand of FIG. 19 in a use position.

Once attached, the leaf spring 272 is positioned to have a fixed end 276 attached to the support stand base 250 and a free end 278 extending over the rotating engagement cam 282. The free end 278 is configured extend over and engage with a flat surface of the rotating cam 282. The free end 278 of the leaf spring 272 is designed to be semi-rigid such that the free end will releasably hold the rotating cam 282 and therefore the support stand arm 222 in either the storage or use position. FIGS. 26A-C show the method of operation of the support stand 220. When the support stand arm 222 is in the storage position, as shown in FIG. 26A, the free end 278 of the leaf spring 272 engages a first flat surface 286 of the rotating cam 282. The leaf spring 272 holds the rotating cam 282 and therefore the arm 222 in the storage position. When the arm 222 is rotated away from the electronic device case (not pictured) with sufficient force, as shown in FIG. 26B, the corner of the rotating cam 282 pushes the free end 278 of the leaf spring 272 out of engagement with the first flat surface 286 of the rotating cam. When the arm 222 reaches the use position, the free end 278 of the leaf spring 272 engages a second flat surface 288 of the rotating cam, as shown in FIG. 26C. The leaf spring 272 holds the support stand arm 222 in the use position until the arm is rotated back toward the storage position with sufficient force. The rotating cam 282 and translating cam 284 interact as described in the previous embodiment. In alternate embodiments, the support stand 220 includes the leaf spring 272 and rotating cam 282, but does not include a translating engagement cam.

While the invention has been described with reference to example embodiments, it will be understood by those skilled in the art that a variety of modifications, additions and deletions are within the scope of the invention, as defined by the following claims.

What is claimed is:
1. A case for an electronic device comprising:
a back panel comprising at least a first receiving feature and a second receiving feature,
one or more sidewalls, and
a support stand selectively extendable from the back panel, wherein the support stand comprises an engagement feature;
wherein the support stand is configured to be releasably held in at least a first use position and a second use position, and wherein each use position defines an angle between the support stand and the back panel;
wherein the engagement feature engages the first receiving feature in the first use position and the engagement feature engages the second receiving feature in the second use position; and
wherein the support stand is configured to support the electronic device in both a horizontal orientation and a vertical orientation.

2. The case of claim 1, wherein the support stand is pivotally attached to the back panel.

3. The case of claim 1, wherein the back panel comprises a recess configured to receive the support stand in a storage position.

4. The case of claim 3, wherein the support stand comprises a retaining feature configured to releasably hold the support stand in the recess in the storage position.

5. The case of claim 1, wherein the engagement feature includes a rib protruding from an end of the support stand.

6. The case of claim 1, wherein the first and second receiving features are channels in the back panel of the case.

7. The case of claim 2, wherein the back panel further comprises a stop surface configured to prevent the support stand from pivoting beyond a maximum angle relative to the back panel.

8. The case of claim 1, wherein in at least one use position, the support stand is configured to support the electronic device in both a horizontal and vertical position.

9. A support stand for an electronic device, the support stand comprising:
- a base;
- an arm pivotally attached to the base; and
- a positioning mechanism comprising:
  - at least one rotating engagement feature; and
  - at least one translating engagement feature configured to releasable engage the rotating engagement feature;
- wherein the arm is configured to be releasably held in a storage position and repositionable from the storage position to at least one use position; and
- wherein the support stand is configured to support the electronic device case in both a horizontal position and a vertical position.

10. The support stand of claim 9, wherein the base is configured for direct attachment to the electronic device.

11. The support stand of claim 9, wherein the base is configured for attachment to a case configured for receiving the electronic device.

12. The support stand of claim 9, further comprising a spring, wherein the spring is configured to bias the at least one translating engagement feature in engagement with the at least one rotating engagement feature.

13. The support stand of claim 9, further comprising a spring, wherein the spring is configured to engage with the at least one rotating feature.

14. The support stand of claim 9, wherein the at least one rotating engagement feature comprises rotating cam comprising a cylindrical body and at least two teeth.

15. The support stand of claim 14, wherein the rotating cam is attached to the arm.

16. The support stand of claim 9, wherein the at least one translating engagement feature comprises a translating cam with a cylindrical body and at least two teeth.

17. The support stand of claim 9, wherein the at least one rotating engagement feature comprises a rotating cam comprising a cylindrical body and at least two teeth and wherein the at least one translating engagement feature comprises a translating cam with a cylindrical body and at least two teeth, and wherein the teeth of the rotating cam are configured to engage the teeth of the translating cam.

18. A support stand for an electronic device case, the support stand comprising:
- an arm pivotally attached to a base, wherein the base is attached to an electronic device case;
- a rotating cam comprising at least a first and second flat surface, wherein the rotating cam is attached to the arm in a fixed position; and
- a leaf spring configured to engage the at least first and second flat surfaces of the rotating cam;
- wherein the support stand is configured to support the electronic device case in both a horizontal position and a vertical position.

19. The support stand of claim 18, wherein the first flat surface corresponds to a storage position of the support stand and wherein the second flat surface corresponds to a use position of the support stand.

20. The support stand of claim 18, wherein the leaf spring is attached within a recess in the base.

* * * * *